US005922693A

United States Patent [19]

Oldenhove

[11] Patent Number: 5,922,693

[45] Date of Patent: Jul. 13, 1999

[54] CLEANING COMPOSITIONS CONTAINING BIOSTATIC AGENT

[75] Inventor: Louis Oldenhove, Heks, Belgium

[73] Assignee: Colgate-Palmolive Co., Piscataway, N.J.

[21] Appl. No.: 09/026,833

[22] Filed: Feb. 20, 1998

Related U.S. Application Data

[63] Continuation-in-part of application No. 08/853,359, May 8, 1997.

[51] Int. Cl.[6] .......................... A01N 33/12; A01N 55/10; A01N 53/14; C11D 3/48

[52] U.S. Cl. ............................ 514/63; 514/184; 514/185; 514/186; 514/252; 514/277; 514/399; 514/494; 514/609; 514/631; 514/634; 514/635; 514/636; 514/642; 514/643; 424/78.08; 424/78.17; 422/28; 422/35; 422/37; 510/382; 510/383; 510/384; 510/391

[58] Field of Search .................................. 422/28, 37, 35; 514/63, 642, 643, 252, 399, 277, 494; 424/78.08, 78.17, 184–186, 609, 631, 634–636; 510/382–384, 391

[56] References Cited

U.S. PATENT DOCUMENTS

| | | | |
|---|---|---|---|
| H269 | 5/1987 | Malik | 422/37 |
| 4,028,261 | 6/1977 | Petersen et al. | 134/42 |
| 4,759,867 | 7/1988 | Choy et al. | 510/384 |
| 4,867,971 | 9/1989 | Ryan et al. | 514/399 |
| 5,130,056 | 7/1992 | Jakobson et al. | 252/551 |
| 5,562,780 | 10/1996 | Bunczk et al. | 134/22.16 |
| 5,643,861 | 7/1997 | de Guertechin et al. | 510/365 |

OTHER PUBLICATIONS

The Merck Index, 11$^{th}$ edition, Merck & Co., Inc., Rahway, NJ, 1989, p. 835, item No. 5181, p. 1271, item No. 8004.

*Primary Examiner*—John Pak
*Attorney, Agent, or Firm*—Richard E. Nanfeldt

[57] ABSTRACT

The present invention relates to an aqueous cleaning composition containing (a) 1 to 10 weight % of at least one surfactant selected from the group consisting of anionic surfactants and ethoxylated nonionic surfactants and mixtures thereof;

(b) 0.2 to 10 weight % of a biostatic agent such as a $C_2$–$C_{20}$ alkyl trimethyl ammonium halide, a $C_8$–$C_{16}$ alkyl dimethyl benzyl ammonium halide, a polyhexamethylene biguanide hydrochloride, a 3-(trialkoxysilyl)propyl $C_{14}$–$C_{20}$ alkyl dimethyl ammonium halide, ketoconazole, and zinc-bis(2-pyridinethiol 1-oxide); and (c) the balance being water; wherein said liquid cleaning composition does not contain a pigment, a chlorine containing bleach, peroxygen bleach, hydrogen peroxide, builder, water soluble or water dispersible organic binding agent, sequestering agent, acid dye, $C_8$–$C_{18}$ fatty acid monoester of diglycerol, $C_8$–$C_{18}$ fatty acid monoester of tetraglycerol, and an organic solvent selected from the group consisting of straight chain primary, secondary or tertiary $C_4$–$C_{10}$ alkanols, $C_5$–$C_{10}$ alicyclic alkanols, $C_2$–$C_4$ dialkyl esters and $C_3$–$C_{20}$ glycol ethers.

7 Claims, No Drawings

CLEANING COMPOSITIONS CONTAINING BIOSTATIC AGENT

RELATED APPLICATION

This application is a continuation in part application of U.S. Ser. No. 8/853,359 filed May 8, 1997.

FIELD OF THE INVENTION

The present invention relates to an aqueous, cleaning composition which is useful for the control of bacteria, fungus, molds, spores, viruses and germs as well as for the removal of grease, soap scum or tar without any mechanical action. In particular, the instant compositions comprise a surfactant system and at least one biostatic agent.

BACKGROUND OF THE INVENTION

Bleaching cleaning, oxidizing and disinfectant compositions have been used in home and industrial applications for hard surface care and fabric care.

Hypochlorite bleaches are very effective at removal of stains, when they are used in relatively high concentrations, but these hypochlorite, as well as other active chlorine bleaches, can cause rather severe damage to fabric colors as well as damaging textile fibers. Additionally, these hypochlorite liquid bleaches can present handling and packaging problems. Color and fabric damage can be minimized by the use of milder oxygen bleaches such as potassium monopersulfate; however, stain removal characteristics of these peroxygen bleaches are much less desirable than those of the harsher halogen bleaching agents. Commercial bleaching compositions which contain peroxygen bleaches commonly utilize activators; which are compounds that enhance the performance of the peroxygen bleachant. Bleaching compositions which have employed various types of bleach activators have been disclosed in: Popkin, U.S. Pat. No. 1,940,768, Dec. 26, 1933; Baevsky, U.S. Pat. No. 3,061,550, Oct. 30, 1962; Mackellar et al, U.S. Pat. No. 3,338,839, Aug. 29, 1967; and Woods, U.S. Pat. No. 3,556, 711, Jan. 19, 1971.

Hydrogen peroxide and surfactant mixtures have been disclosed in European Patent Application and Patent Nos: EP 0376,704B1; EP 0376706A1 and EP 0009839B2.

Many cleaners combining a disinfecting or biostatic action with a cleaning function have already been commercialized and are present on the market place in various product categories, mainly household and personal care. These products are based on various chemistries or action modes and are designed to deliver an instantaneous disinfecting or sanitizing action at the point of use. The instant invention teaches that it is possible to deliver, by means of incorporating suitable ingredients in appropriate cleaning compositions, a preventive action delaying the growth of stains (bacteria and/or molds) on the treated surfaces, thereby retarding associated nuisances such as contamination, malodor and staining.

The present invention brings a new and different technical benefit: it has been found that it is possible to deliver, independently of an optional disinfection taking place at the point of use, a preventive action able to considerably retard further strain growth on the treated porous surface. This can be achieved by incorporating in a composition a well selected "biostatic" molecule which acts as a "surface preservative" and delays new germs development; this composition can optionally incorporate a bleaching agent. Ideal compositions are those presenting excellent wetting properties to allow a deep penetration of the composition in pores and fractures, and thus an improved in depth active delivery.

These compositions are able to deliver both a cleaning action and a remanant prevention against further strain growth. Derived products contain user friendly ingredients compared to the currently used aggressive chlorine based compositions. Such products which confer to the cleaning action a sanitizing secondary benefit would also permit a less frequent cleaning whilst maintaining the surfaces longer clean and hygienic.

Such products should especially be useful in bathroom where it is very difficult to get rid of colored molds such as *Aspergillus niger, Rhodotorula minuta* and various Penicilium species.

The present invention relates to a biostatic agent containing cleaning composition, suitable at room temperature or colder or at a higher temperature for pre-treating and cleaning materials soiled with a lipophilic soil. The composition comprises a biostatic agent together with at least one surfactant and water. The invention also relates to the killing as well as the prevention of the formation of fungus, molds, spores, viruses, germs and bacteria as well as to a processes for treating items and materials soiled with soils such as lipophilic soil, with compositions of this invention.

SUMMARY OF THE INVENTION

The instant invention relates to a cleaning composition comprising at least one surfactant, a biostatic agent and water.

Accordingly, it is an object of the instant invention to provide an aqueous cleaning composition which is useful in a cleaning operation for the control and prevention of the formation of bacteria, fungus, molds and germs as well as for removal of grease and soap scum.

DETAILED DESCRIPTION OF THE INVENTION

The present invention relates to an aqueous cleaning composition which comprises approximately by weight:

a) 0.5 to 10%, more preferably 1.5 to 8% of at least one surfactant selected from the group consisting of anionic surfactants and nonionic surfactants and mixtures thereof;

b) 0.2 to 10 wt. %, more preferably 0.4 to about 8 wt. % of a biostatic agent; and (c) the balance being water, wherein the composition does not contain any chlorine containing bleach, a peroxygen bleach, hydrogen peroxide or builder, wherein the cleaning composition does not contain any water soluble or water dispersible organic binding agent, sequestering agent, acid dye, pigment, an organic solvent selected from straight chain, primary, secondary and tertiary $C_4$–$C_{10}$ alkanols, $C_5$–$C_{10}$ alicyclic alkanols, $C_2$–$C_4$ dialkyl ethers, $C_3$–$C_{20}$ glycol ethers and mixtures thereof, $C_8$–$C_{18}$ fatty acid monoester of diglycerol, and $C_8$–$C_{18}$ fatty acid diester of tetraglycerol.

The water soluble ethoxylated nonionic surfactants which can be utilized in this invention are commercially well known and include the primary aliphatic alcohol ethoxylates, secondary aliphatic alcohol ethoxylates, alkylphenol ethoxylates and ethylene-oxide-propylene oxide condensates on primary alkanols, such a Plurafacs (BASF) and condensates of ethylene oxide with sorbitan fatty acid esters such as the Tweens (ICI). The nonionic synthetic organic detergents generally are the condensation products of an organic aliphatic or alkyl aromatic hydrophobic compound and hydrophilic ethylene oxide groups. Practically any hydrophobic compound having a carboxy, hydroxy, amido, or amino group with a free hydrogen attached to the nitrogen can be condensed with ethylene oxide or with the polyhydration product thereof, polyethylene glycol, to form a water-soluble nonionic detergent. Further, the length of the polyethenoxy chain can be adjusted to achieve the desired balance between the hydrophobic and hydrophilic elements.

The nonionic detergent class includes the condensation products of a higher alcohol (e.g., an alkanol containing about 8 to 18 carbon atoms in a straight or branched chain configuration) condensed with about 5 to 30 moles of ethylene oxide, for example, lauryl or myristyl alcohol condensed with about 16 moles of ethylene oxide (EO), tridecanol condensed with about 6 to moles of EO, myristyl alcohol condensed with about 10 moles of EO per mole of myristyl alcohol, the condensation product of EO with a cut of coconut fatty alcohol containing a mixture of fatty alcohols with alkyl chains varying from 10 to about 14 carbon atoms in length and wherein the condensate contains either about 6 moles of EO per mole of total alcohol or about 9 moles of EO per mole of alcohol and tallow alcohol ethoxylates containing 6 EO to 11 EO per mole of alcohol.

A preferred group of the foregoing nonionic surfactants are the Neodol ethoxylates (Shell Co.), which are higher aliphatic, primary alcohol containing about 9–15 carbon atoms, such as $C_9$–$C_{11}$ alkanol condensed with 8 moles of ethylene oxide (Neodol 91-8), $C_{12\text{-}13}$ alkanol condensed with 6.5 moles ethylene oxide (Neodol 23-6.5), $C_{12\text{-}15}$ alkanol condensed with 12 moles ethylene oxide (Neodol 25-12), $C_{14\text{-}15}$ alkanol condensed with 13 moles ethylene oxide (Neodol 45-13), and the like. Such ethoxamers have an HLB (hydrophobic lipophilic balance) value of about 8–15 and give good O/W emulsification, whereas ethoxamers with HLB values below 8 contain less than 5 ethyleneoxide groups and tend to be poor emulsifiers and poor detergents.

Additional satisfactory water soluble alcohol ethylene oxide condensates are the condensation products of a secondary aliphatic alcohol containing 8 to 18 carbon atoms in a straight or branched chain configuration condensed with 5 to 30 moles of ethylene oxide. Examples of commercially available nonionic detergents of the foregoing type are $C_{11}$–$C_{15}$ secondary alkanol condensed with either 9 EO (Tergitol 15-S-9) or 12 EO (Tergitol 15-S-12) marketed by Union Carbide.

Other suitable nonionic detergents include the polyethylene oxide condensates of one mole of alkyl phenol containing from about 8 to 18 carbon atoms in a straight- or branched chain alkyl group with about 5 to 30 moles of ethylene oxide. Specific examples of alkyl phenol ethoxylates include nonyl phenol condensed with about 9.5 moles of EO per mole of nonyl phenol, dinonyl phenol condensed with about 12 moles of EO per mole of dinonyl phenol, dinonyl phenol condensed with about 15 moles of EO per mole of phenol and di-isoctylphenol condensed with about 15 moles of EO per mole of phenol. Commercially available nonionic surfactants of this type include Igepal CO-630 (nonyl phenol ethoxylate) marketed by GAF Corporation.

Condensates of 2 to 30 moles of ethylene oxide with sorbitan mono- and tri-$C_{10}$–$C_{20}$ alkanoic acid esters having a HLB of 8 to 15 also may be employed as the nonionic detergent ingredient in the described shampoo. These surfactants are well known and are available from Imperial Chemical Industries under the Tween trade name. Suitable surfactants include polyoxyethylene (4) sorbitan monolaurate, polyoxyethylene (4) sorbitan monostearate, polyoxyethylene (20) sorbitan trioleate and polyoxyethylene (20) sorbitan tristearate.

Suitable water-soluble non-soap, anionic surfactants used in the instant compositions include those surface-active or detergent compounds which contain an organic hydrophobic group containing generally 8 to 26 carbon atoms and preferably 10 to 18 carbon atoms in their molecular structure and at least one water-solubilizing group selected from the group of sulfonate, sulfate and carboxylate so as to form a water-soluble detergent. Usually, the hydrophobic group will include or comprise a $C_8$–$C_{22}$ alkyl, alkyl or acyl group. Such surfactants are employed in the form of water-soluble salts and the salt-forming cation usually is selected from the group consisting of sodium, potassium, ammonium, magnesium and mono-, di- or tri-$C_2$–$C_3$ alkanolammonium, with the sodium, magnesium and ammonium cations again being preferred.

Examples of suitable sulfonated anionic surfactants are the well known higher alkyl mononuclear aromatic sulfonates such as the higher alkyl benzene sulfonates containing from 10 to 16 carbon atoms in the higher alkyl group in a straight or branched chain, $C_8$–$C_{15}$ alkyl toluene sulfonates and $C_8$–$C_{15}$ alkyl phenol sulfonates.

A preferred sulfonate is linear alkyl benzene sulfonate having a high content of 3-(or higher) phenyl isomers and a correspondingly low content (well below 50%) of 2-(or lower) phenyl isomers, that is, wherein the benzene ring is preferably attached in large part at the 3 or higher (for example, 4, 5, 6 or 7) position of the alkyl group and the content of the isomers in which the benzene ring is attached in the 2 or 1 position is correspondingly low. Particularly preferred materials are set forth in U.S. Pat. No. 3,320,174.

Other suitable anionic surfactants are the olefin sulfonates, including long-chain alkene sulfonates, long-chain hydroxyalkane sulfonates or mixtures of alkene sulfonates and hydroxyalkane sulfonates. These olefin sulfonate detergents may be prepared in a known manner by the reaction of sulfur trioxide ($SO_3$) with long-chain olefins containing 8 to 25, preferably 12 to 21 carbon atoms and having the formula $RCH{=}CHR_1$ where R is a higher alkyl group of 6 to 23 carbons and $R_1$ is an alkyl group of 1 to 17 carbons or hydrogen to form a mixture of sultones and alkene sulfonic acids which is then treated to convert the sultones to sulfonates. Preferred olefin sulfonates contain from 14 to 16 carbon atoms in the R alkyl group and are obtained by sulfonating an α-olefin.

Other examples of suitable anionic sulfonate surfactants are the paraffin sulfonates containing 10 to 20, preferably 13 to 17, carbon atoms. Primary paraffin sulfonates are made by reacting long-chain alpha olefins and bisulfites and paraffin sulfonates having the sulfonate group distributed along the paraffin chain are shown in U.S. Pat. Nos. 2,503,280; 2,507,088; 3,260,744; 3,372,188; and German Patent 735,096.

Examples of satisfactory anionic sulfate surfactants are the $C_8$–$C_{18}$ alkyl sulfate salts and the $C_8$–$C_{18}$ alkyl sulfate salts and the $C_8$–$C_{18}$ alkyl ether polyethenoxy sulfate salts having the formula $R(OC_2H_4)_n\ OSO_3M$ wherein n is 1 to 12, preferably 1 to 5, and M is a metal cation selected from the group consisting of sodium, potassium, ammonium, magnesium and mono-, di- and triethanol ammonium ions. The alkyl sulfates may be obtained by sulfating the alcohols obtained by reducing glycerides of coconut oil or tallow or mixtures thereof and neutralizing the resultant product.

On the other hand, the alkyl ether polyethenoxy sulfates are obtained by sulfating the condensation product of ethylene oxide with a $C_8$–$C_{18}$ alkanol and neutralizing the resultant product. The alkyl sulfates may be obtained by sulfating the alcohols obtained by reducing glycerides of coconut oil or tallow or mixtures thereof and neutralizing the resultant product. On the other hand, the alkyl ether polyethenoxy sulfates are obtained by sulfating the condensation product of ethylene oxide with a $C_8$–$C_{18}$ alkanol and neutralizing the resultant product. The alkyl ether polyethenoxy sulfates differ from one another in the number of moles of ethylene oxide reacted with one mole of alkanol. Preferred alkyl sulfates and preferred alkyl ether polyethenoxy sulfates contain 10 to 16 carbon atoms in the alkyl group.

The $C_8$–$C_{12}$ alkylphenyl ether polyethenoxy sulfates containing from 2 to 6 moles of ethylene oxide in the molecule also are suitable for use in the inventive compositions. These surfactants can be prepared by reacting an alkyl phenol with 2 to 6 moles of ethylene oxide and sulfating and neutralizing the resultant ethoxylated alkyiphenol.

Other suitable anionic surfactants are the $C_9$–$C_{15}$ alkyl ether polyethenoxyl carboxylates having the structural formula $R(OC_2H_4)_nOX\ COOH$ wherein n is a number from 4 to 12, preferably 5 to 10 and X is selected from the group consisting of $CH_2$, $(C(O)R_1$ and

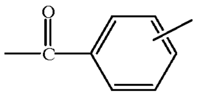

wherein $R_1$ is a $C_1$–$C_3$ alkylene group. Preferred compounds include $C_9$–$C_{11}$ alkyl ether polyethenoxy (7-9) C(O) $CH_2CH_2COOH$, $C_{13}$–$C_{15}$ alkyl ether polyethenoxy (7-9)

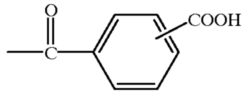

and $C_{10}$–$C_{12}$ alkyl ether polyethenoxy (5–7) $CH_2COOH$. These compounds may be prepared by considering ethylene oxide with appropriate alkanol and reacting this reaction product with chloracetic acid to make the ether carboxylic acids as shown in U.S. Pat. No. 3,741,911 or with succinic anhydride or phthalic anhydride. Obviously, these anionic surfactants will be present either in acid form or salt form depending upon the pH of the final composition, with salt forming cation being the same as for the other anionic surfactants.

The biostatic agents used in the instant composition at a concentration of 0.2 to 10 wt. %, more preferably 0.4 to 8 wt. % are selected from the group consisting essentially of a $C_8$–$C_{16}$ alkyl dimethyl benzyl ammonium halide such as dodecyl dimethyl benzyl ammonium chloride (Benzalkonium chloride), a $C_{12}$–$C_{20}$ alkyl trimethyl ammonium halide such as cetyl trimethyl ammonium chloride (Cetrimonium chloride), polyhexamethylene biguanide hydrochloride (Tradename, COSMOCIL CQ), a 3-(trialkoxysilyl)propyl $C_{14}$–$C_{20}$ alkyl dimethyl ammonium halide such as 3-(trimethoxysilyl)propyl octadecyl dimethyl ammonium chloride, (Tradename DC5700-Dow Corning), cis-1-acetyl-4-[4[[2-(2,4-dichlorophenyl)-2-(1H-imidazol-1ylmethyl)-1,3 dioxalan-4-yl]methoxy]phenyl] piperazine (tradename—Ketoconazole), 1-(4-chlorophenoxy)-1-(1H-Imidazolyl)-3,3 dimethyl-2-butanone (tradename—Climbazole) and zinc-bis(2-pyridine-thiol 1-oxide) (tradename Zn Pyrithione) and mixtures thereof.

The following examples illustrate but do not limit the invention. Unless otherwise indicated, all parts in these examples, in the specification and in the appended claims are by weight percent and all temperatures are in ° C.

The formulas A through N were prepared by simple mixing at 25° C.

EXAMPLE 1

| | A | B | C | D | E | F | G | H |
|---|---|---|---|---|---|---|---|---|
| Sodium lauryl sulfate | | | | | | 2 | | |
| Neodol 91-5 | | | | | | | 2 | |
| Biguanide | | | | | | | | 0.5 |
| DC5700 | | 0.5 | 0.75 | 1 | 2 | 0.5 | 0.5 | |
| Cimbazole | | | | | | | | |
| Ketoconazole | | | | | | | | |
| $H_2O$ | 100 | 99.5 | 99.25 | 99 | 98 | 97.5 | 97.5 | 99.5 |
| Days to slight trace of mold | 1 | 1 | 1 | 1 | 4 | 48 | 51 | 7 |
| Days to heavy trace of mold | 4 | 4 | 4 | 4 | 7 | >100 | >100 | 14 |

| | I | J | K | L | M | N |
|---|---|---|---|---|---|---|
| Sodium lauryl sulfate | | | | | | |
| Neodol 91-5 | | | | 2 | 2 | 2 |
| Biguanide | 0.75 | 1.0 | 2 | 0.5 | | |
| DC5700 | | | | | | |
| Cimbazole | | | | | | 0.5 |
| Ketoconazole | | | | | 0.5 | |
| $H_2O$ | 99.25 | 99.0 | 98.0 | 97.5 | 97.5 | 97.5 |
| Days to slight trace of mold | 4 | 7 | 5 | >100 | 81 | 28 |
| Days to heavy trace of mold | 8 | 14 | 28 | >100 | >100 | >100 |

A test has been designed to specifically evidence a germ growth preventive action has been devised. This lab test intends to be as close as possible of realistic conditions.

Test Material Selection:

In real world conditions, domestic strains, more especially molds, develop mainly in confined humid areas and appear on tiles grouting, concrete or plaster walls, wall paper as well as in silicone sealings interstices, shower curtain folds, etc.; these areas in which a permanent humidity can stay are prone to promote bacteria and molds apparition. Porous substrates such as the back side of wall tiles have been selected as lab culture medium.

In real world conditions, a minimum nutrient material (carbohydrate food, stuffing electrolytes . . . ) is also needed to sustain the germs culture; it can be initially present (paper, glue . . . ) or can result from the build-up of external contaminants (soapy water, air condensates, food or beverage stains . . . ). It has been found that boiled orange juice is a very effective nutritive solution for lab purpose. Nutrient solution used in the following experiments is made from orange juice extract; this extract is prepared by boiling 1 l orange juice for ½ hour and bringing back its volume to 1 l by addition of Dl water.

As inoculating material, the mold spores present on a naturally contaminated shower curtain have been collected. They were previously identified as being mainly *Aspergillus niger, Rhodotorula minuta, Candida albicans* and various Penicilium strains.

Procedure:

1. Bathroom keramic tiles are immersed in a 5% hydrogen peroxide solution to eliminate potential undesirable germs. They are left overnight backside up to allow drying.

2. The back side of these tiles are treated with 20 g of prototype sample (2 replicates per prototype).

3. Tiles are then allowed to dry overnight (backside up).

4. Nutrient and inoculating solutions are then applied together (mixture of 50 ml germ containing solution per liter nutrient solution) on the porous side of the tiles (±20 g mixture per tile).

5. After penetration of nutrient solution, the replicates tiles pairs are stacked two by two, backside on backside and deposited on a plastic film lying on a flat area. To avoid cross-contamination, stacks are separated one from each other by about 1 cm. Another plastic film is placed on the test samples to prevent them from important moisture loss and to protect ambient atmosphere against contamination.

6. Each day, the state of the tiles is monitored (signs of color or odor changes, of mold apparition or proliferation are noted). If needed, some water is sprayed on all tiles to maintain an adequate humidity level.

7. Tiles which are significantly contaminated by molds and/or bacteria are removed and treated with a hypochlorite solution.

The invention has been described with respect to various embodiments and illustrations of it but is not to be considered as limited to these because it is evident that one of skill in the art with the present specification before him/her will be able to utilize substitutes and equivalents without departing from the invention.

What is claimed is:

1. A liquid cleaning composition comprising approximately by weight:

(a) 1% to 10% of at least one surfactant selected from the group consisting of anionic surfactants and ethoxylated nonionic surfactants and mixtures thereof;

(b) 0.2% to 10% of a biostatic agent selected from the group consisting of a $C_{12}$–$C_{20}$ alkyl trimethyl ammonium halide, a $C_8$–$C_{16}$ alkyl dimethyl benzyl ammonium halide, a polyhexamethylene biguanide hydrochloride, a 3-(trialkoxysilyl)propyl $C_{14}$–$C_{20}$ alkyl dimethyl ammonium halide, ketoconazole, and zinc-bis(2-pyridinethiol 1-oxide); and (c) the balance being water; wherein said liquid cleaning composition does not contain a pigment, a chlorine containing bleach, peroxygen bleach, hydrogen peroxide, builder, water soluble or water dispersible organic binding agent, sequestering agent, acid dye, $C_8$–$C_{18}$ fatty acid monoester of diglycerol, $C_8$–$C_{18}$ fatty acid monoester of tetraglycerol, and an organic solvent selected from the group consisting of straight chain primary, secondary or tertiary $C_4$–$C_{10}$ alkanols, $C_5$–$C_{10}$ alicyclic alkanols, $C_2$–$C_4$ dialkyl esters and $C_3$–$C_{20}$ glycol ethers.

2. The composition according to claim 1, wherein said biostatic agent is a $C_8$–$C_{16}$ alkyl dimethyl benzyl ammonium halide.

3. The composition according to claim 1, wherein said biostatic agent is a $C_{12}$–$C_{20}$ alkyl trimethyl ammonium halide.

4. The composition according to claim 1, wherein said biostatic agent is a polyhexamethylene biquanide hydrochloride.

5. The composition according to claim 1, wherein said biostatic agent is Ketoconazole.

6. The composition according to claim 1, wherein said biostatic agent is zinc-bis(2-pyridinethiol 1-oxide).

7. The composition according to claim 1 wherein the biostatic agent is a 3-(trialkoxysilyl)propyl $C_{14}$–$C_{20}$ alkyl dimethyl ammonium halide.

* * * * *